March 9, 1965     W. H. WENTLING     3,172,195
PULLEYS
Original Filed March 10, 1960     2 Sheets-Sheet 1
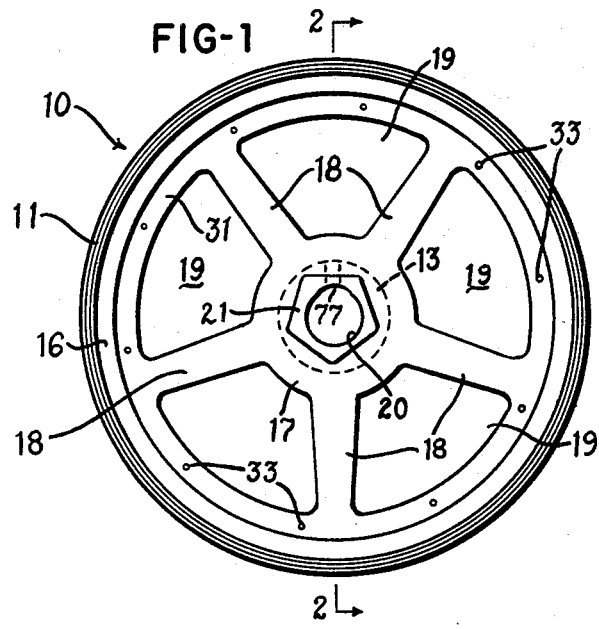
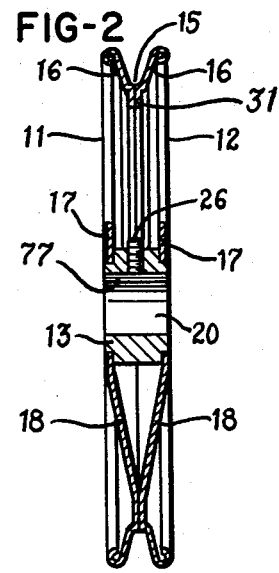
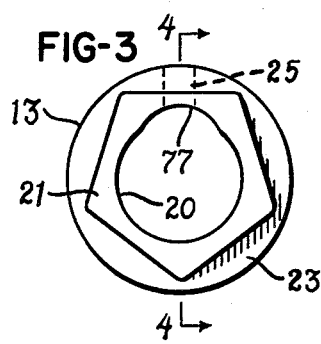
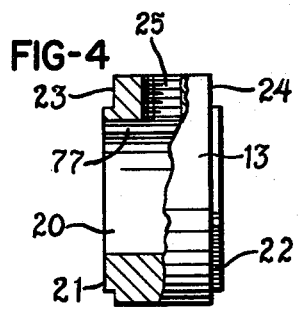
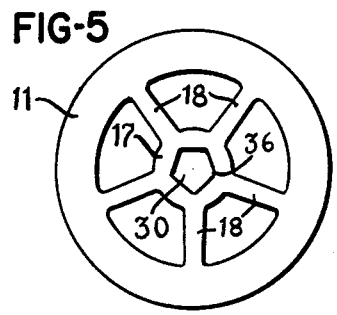
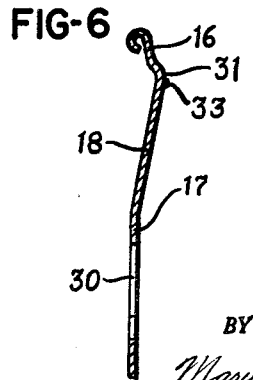
*INVENTOR.*
WILLIAM H. WENTLING
BY
Marechal, Biebel, French & Bugg
ATTORNEYS March 9, 1965 W. H. WENTLING 3,172,195
PULLEYS
Original Filed March 10, 1960 2 Sheets-Sheet 2
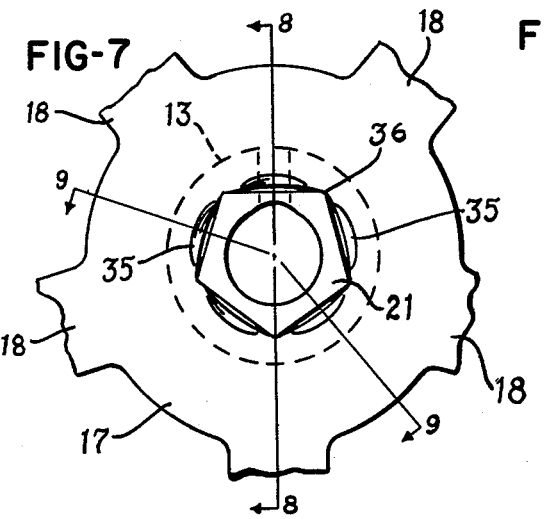
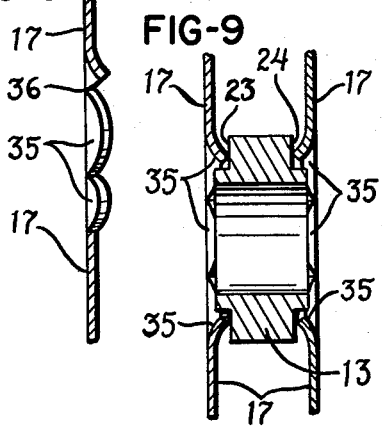
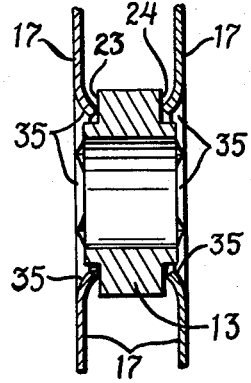
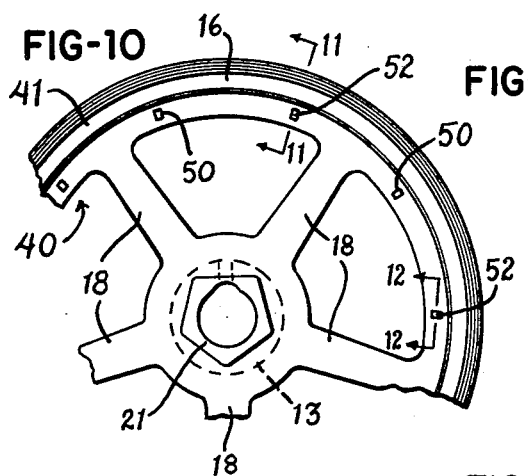
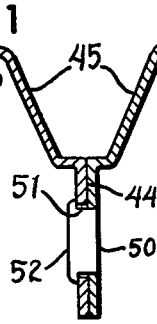
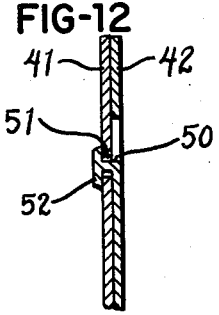
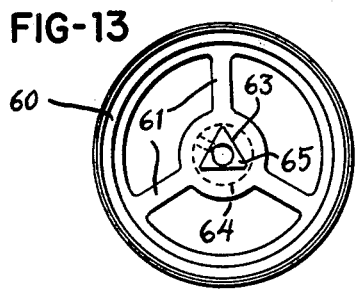
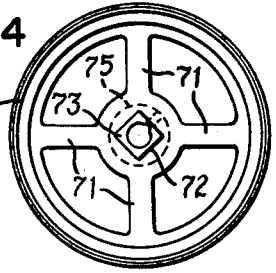
*INVENTOR.*
WILLIAM H. WENTLING
BY
Marechal, Biebel, French & Bugg
ATTORNEYS United States Patent Office 3,172,195
Patented Mar. 9, 1965

3,172,195
PULLEYS
William H. Wentling, Dayton, Ohio, assignor to The Lau Blower Company, Dayton, Ohio, a corporation of Ohio
Original application Mar. 10, 1960, Ser. No. 14,069, now Patent No. 3,094,009, dated June 18, 1963. Divided and this application Sept. 26, 1961, Ser. No. 140,736
4 Claims. (Cl. 29—159)

This application is a division of my copending application, Serial No. 14,069, filed March 10, 1960, now Patent No. 3,094,009, issued June 18, 1963.

The present invention relates to a pulley wheel, and to the manufacture of pulley wheels from sheet metal.

One of the principal objects of the present invention is to provide a pulley wheel of novel characteristics which may be produced from a pair of metal disks stamped from sheet stock and secured together and to a central hub member in a novel manner resulting in a pulley wheel of strength, rigidity, balance and trueness of alignment under service conditions.

Another object of the invention is to provide a pulley wheel as outlined above wherein the hub member is positively secured to the disk elements and which requires a minimum amount of welding or other fabricating to connect the elements into an operative assembly.

It is also a particular object of the invention to provide a pulley wheel construction as outlined above wherein the hub member is positively secured to the sheet metal disks without the necessity of welding thereto and wherein the hub member may therefore be fabricated from a wide selection of materials including materials which are not capable of being welded but are more easily fabricated than metals capable of welding.

An additional object of the invention is to provide a simple and economical method of manufacturing pulley wheels wherein the disks are held in radial compression around a boss on the hub to resist any rotary or axial movement between the disks and the hub without the necessity of welding, staking or other direct connection thereto.

Additional objects and advantages of the invention will be apparent from the following description, the accompanying drawings and the appended claims.

In the drawings—

FIG. 1 is a view in side elevation of a sheet metal pulley constructed in accordance with the invention;

FIG. 2 is a section on the line 2—2 of FIG. 1;

FIG. 3 is a detail view of the hub member of the pulley of FIGS. 1–2;

FIG. 4 is a view partly in side elevation and partly in section on the line 4—4 of FIG. 3;

FIG. 5 is an elevational view on a smaller scale of one of the sheet metal blanks employed in producing the pulley of FIGS. 1–2;

FIG. 6 is a fragmentary section through one of the formed disk members of the pulley of FIGS. 1–2 prior to assembly thereof with the other component parts of the pulley;

FIG. 7 is a fragmentary view in side elevation showing one stage in the assembly of the hub and disk members of FIGS. 3–6 to form the pulley wheel of FIGS. 1 and 2;

FIG. 8 is a fragmentary sectional view through one of the disk members immediately prior to assembly with the hub, the view being taken on the line 8—8 of FIG. 7;

FIG. 9 is a section on the line 9—9 of FIG. 7;

FIG. 10 is a view similar to FIG. 1 showing a pulley in accordance with the invention wherein the two disk members are riveted together;

FIG. 11 is an enlarged fragmentary section on the line 11—11 of FIG. 10;

FIG. 12 is an enlarged fragmentary section on the line 12—12 of FIG. 10; and

FIGS. 13 and 14 are views similar to FIGS. 1 and 10 but on a smaller scale showing other configurations of pulleys in accordance with the invention.

The present invention has particular application to the manufacture of pulley wheels of the character employed with belts such as V-belts, and it provides a pulley wheel of this type which is simple and strong but lightweight construction and which possesses material advantages in production and use. The pulley wheel of the invention is manufactured from a pair of stamped disk members blanked and formed from sheet metal stock by a series of simple stamping operations such as can be readily carried out on a punch press with dies of simple configuration, and each disk includes angularly spaced spoke portions integrally connecting the inner and outer annular portions of the disks.

In assembling the component parts of a pulley wheel in accordance with the invention, the two sheet metal disks are assembled around a central hub member, and the hub member is formed at each end with a non-circular boss which fits within a complementary aperture in the adjacent disk to provide a positive driving engagement therebetween. In blank form, the disks are shaped so as to have a portion of the disk along each side of the aperture deflected out of the plane of the surrounding portion of the disk. At this stage of manufacture, the aperture is slightly larger than the complementary non-circular boss.

During the assembly operation, the boss of the hub is inserted into the aperture in the disk with the deflected portion of the disk adjacent the hub. The deformed portions are then forced into the plane of the surrounding portion of the disk to compress the edges of the aperture against the boss, thereby placing an inner annular portion of the disk surrounding the aperture in radial compression with respect to said boss. The disks are then secured together as by welding or otherwise fastening their outer portions directly together, and the parts are so proportioned that in the completed wheel, the central portions of the disks are held under tension compressing the hub member therebetween. It is therefore unnecessary in accordance with the invention to provide any other direct connection between the disks and the hub member.

Referring now more specifically to the drawings, which illustrate preferred embodiments of the invention, FIGS. 1 and 2 show an assembled pulley wheel 10 which is composed of a pair of identical disks 11 and 12 of sheet metal and a central hub 13. The wheel has a belt-receiving groove 15 formed by oppositely flared annular outer portions 16 of the disks 11 and 12. Each of the disks 11 and 12 also includes a central portion 17 and five spokes 18 formed by open cutouts 19 therethrough and connecting the portions 16 and 17.

The central hub 13 includes an axial bore 20 for mounting on a shaft, and it is cylindrical over the major portion of its outer surface. At each end, however, the hub is formed to provide a boss 21 and 22 of smaller area than the remainder of the hub to provide surrounding shoulders 23 and 24, and each of these bosses is shown as of the configuration of a regular pentagon to match the five-spoke construction of the disks 11 and 12. The hub 13 is also provided with a drilled and tapped hole 25 for a set screw 26 for securing the hub to the shaft, and it will be noted that the hole 25 extends perpendicularly to the adjacent side face of the bosses 21 and 22.

One of the disks 11 is shown in blank form in FIG. 5, and it is provided with a polygonal opening 30 proportioned for closely receiving one of the bosses 21 and 22. It should be particularly noted that the corners of the opening 30 are aligned with the respective spokes 18 so that the sides of this opening face the respective cutouts 19.

FIG. 6 shows a portion of one of the disks 11 and 12 after it has been formed following the blanking operation, and the forming operations thereon may be readily carried out in the manner described in Wilken Patent No. 2,641,935 issued June 16, 1953 to the assignee of this application. As shown in FIG. 6, the formed disk includes an annular band 31 adjacent the inner periphery of the portion 16 of the disk which defines one side of the belt receiving groove 15 in the finished wheel, and the band 31 is also formed to include a plurality of welding dimples 33. FIG. 6 also shows that in the formed disk, the central portion which contains the hub opening 30 is axially offset from the band 31, and the parts are so proportioned that the axial spacing between the inner surfaces of these portions is somewhat less than one-half the axial length of the cylindrical portion of hub 13 between the shoulders 23 and 24. For example, satisfactory results have been obtained in a pulley having an overall diameter of eight inches with the cylindrical portion of the hub approximately .85 inch in length and with the axial spacing of the surfaces 31 and 17 approximately .375 inch.

In addition to the forming of the disks 11 and 12 as just described, before the disks are assembled with the hub 13, the central portion of each disk is formed as best seen in FIGS. 7 and 8. More specifically, a portion along each side of the central aperture 30 is deformed at 35 out of the plane of the surrounding area and away from the front surface of the disk. The corners 36 of the aperture 30 remain in their original plane, and they are dimensioned for close fitting with the corners of the boss portion 21, which are preferably slightly rounded for ease of assembly with the disks. The deformed portions 35, however, effectively enlarge the area of the aperture 30 to a size appreciably greater than the boss 21, satisfactory results having been attained with the radial distance of the aperture 30 to the projection at the mild-point of each portion 35 approximately 0.005 inch greater than the corresponding dimension of the boss 21.

With the component parts of the proportions described, when they are assembled in the manner shown in FIGS. 7 and 9, the deformed portions 35 engage the shoulders 23 and 24. The disks are then compressed toward each other until these deformed portions 35 are returned into substantially their original planes as shown in the finished wheel of FIG. 2, and this operation places a part of the inner portion of each disk in radial compression around its associated boss and thereby firmly secures each disk to the hub.

During this same compressing operation on the center portions of the disks, the outer portions of the disks 11 and 12 are compressed toward each other in order to bring the surfaces of the annular bands 31 together, which will result in placing the inner portions of the disks in tension against the shoulders 23 and 24 and thereby compressing the cylindrical portion of the hub 13 between the disk portions 17. This operation may be carried out in conjunction with the welding of the surfaces together through the welding dimples 33, which may be carried out in the manner described in the above Wilken patent. There is no necessity however, for welding of the disks to the hub 13, because of the proportioning and assembling of the parts as described and the use of non-circular bosses 21 and 22 to provide the driving connection between the hub and the disks.

The invention is not limited to welding the respective disks together, and a variety of other means may be used. For example, FIGS. 10–12 show convenient means for riveting the disks together to form a pulley wheel 40 constructed from a pair of disks 41 and 42 which are generally similar to the disks 11 and 12 and similarly include annular bands 44 adjacent the inner periphery of the portions 45 defining the belt receiving groove.

In FIGS. 10–12, each of the disks 41 and 42 is provided with a plurality of integral tabs 50 formed out of the plane of the band 44 away from the front side of the disk, and each disk also includes a plurality of small openings 51 in the band 44 proportioned to receive the tabs 50. These disks are assembled with the hub 13 in the same manner as described in connection with FIGS. 7–9 except that in place of welding, the tabs 50 are inserted in the opposed openings 51 and are then riveted as indicated at 52 to secure the parts together.

A further practical advantage deriving from the invention is the automatic indexing of the disks with respect to each other in such manner that the respective spokes therein are in accurate axial alignment. The bosses 21 and 22 on the hub accomplish this result automatically without the necessity for aligning jigs or fixtures. In addition, with the holes 30 aligned as described with respect to the spokes, and with the set screw hole 25 perpendicular to one of the side faces of the bosses 21 and 22, the parts are automatically aligned with a pair of cutouts 19 for maximum ease of access by a wrench or screw driver to the set screw, and the same indexing effect is also provided for the tabs 50 and openings 51 in assembling the disks 41 and 42.

In connection with the point just discussed, it should be understood that the configuration of the bosses 21–22 and the holes 25 should be selected in accordance with the number of spokes in the disks 11 and 12, and this is illustrated by FIGS. 13 and 14. Thus in FIG. 13, the disk 60 corresponds to the disk 11 or 12 except that it has only three spokes 61. The hole 63 is accordingly triangular in shape with its corners aligned with the spokes 61, and the hub 64 is provided with similar triangular bosses 65. FIG. 14 shows a pulley wherein each disk 70 is similar to the disk 60 except that it has four spokes 71 and is therefore provided with a square central hole 72 to receive a similarly shaped boss 73 on the associated hub 75. For assembly purposes, the blank disks of the pulleys shown in FIGS. 13 and 14 are formed with a deformed portion of the disk along each side of the aperture as described for the aperture having five sides shown in FIGS. 7–9, and similar steps are employed during assembly.

The pulley wheels of the invention and their mode of assembly offer a plurality of practical advantages. For example, there is provided a positive driving connection between the component hub and disks without the necessity of welding or otherwise securing the disks to the hub, and this in turn makes it possible to construct the hub of a wide variety of materials including materials which are not capable of being welded. In particular, it has been found advantageous to fabricate the hubs of powdered metal, which can be done at substantially lower cost than forged, cast or machined hubs such as are necessary if the hub is to be welded to the disks, such for example as spinning or staking, neither of which can as a practical matter be carried out with hubs of powdered metal. In addition, it is simple to mold the powdered metal hub with a groove 77 in the bore 20 aligned with the set screw hole 25 for clearing the burr which the set screw tends to produce on a cylindrical shaft, and production of such groove in other types of hub would commonly require additional machining.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. The method of manufacturing a pulley wheel which comprises the steps of providing a hub including at each end thereof a boss of polygonal radial cross-section and smaller area than the remainder of said hub for defining an annular shoulder on each end of said hub, blanking from sheet metal a pair of disks each including a central part and a rim portion and each having in said central portion thereof a polygonal aperture having a configuration generally complementary to one of said bosses and smaller in size, said polygonal aperture including a plurality of side edges which intersect at the corner of said aperture, deforming the portions of said central part adjacent said edges out of the plane of said central part to enlarge said aperture so that one of said bosses is easily received therein while maintaining the portion of said central part adjacent said corners in the original plane of said central part, assembling said disks with said hub therebetween and with said bosses received in said apertures, compressing said deformed portions of each of said disks back into the planes of said central part and against the adjacent said shoulder on said hub to force said central part into compressing relation with the sides of said bosses to resist relative radial movement between said disks and said hub, and securing said rim portions of said disks together to resist relative axial movement between said disks and said hub.

2. The method of manufacturing a pulley wheel which comprises the steps of providing a hub including at each end thereof a boss of polygonal radial cross-section and smaller area than the remainder of said hub for defining an annular shoulder on each end of said hub, blanking from sheet metal a pair of disks each including a central part and a rim portion and each having in said central portion thereof a polygonal aperture having a configuration generally complementary to one of said bosses and smaller in size, said polygonal aperture including a plurality of side edges which intersect at the corners of said aperture, deforming the portions of said central part adjacent said edges out of the plane of said central part to enlarge said aperture so that one of said bosses is easily received therein, simultaneously maintaining the portion of said central part adjacent said corners in the original plane of said central part so that said corners guide said disks onto said bosses, assembling said disks with said hub therebetween and with said bosses received in said apertures, and then simultaneously compressing said deformed portions of each of said disks back into the planes of said central part and against the adjacent said shoulder on said hub to force said central part into compressing relation with the sides of said bosses to resist relative radial movement between said disks and said hub and securing said rim portions of said disks together to resist relative axial movement between said disks and said hub.

3. The method of manufacturing a pulley wheel which comprises the steps of providing a hub including at each end thereof a boss of polygonal radial cross-section and smaller area than the remainder of said hub for defining an annular shoulder on each end of said hub, forming from sheet metal a pair of disks each including a central part and a rim portion and each having in said central portion thereof a polygonal aperture having a configuration generally complementary to one of said bosses and slightly smaller in size, said polygonal aperture including a plurality of side edges which intersect at the corners of said aperture, deforming the portions of said central part adjacent said edges out of the plane of said central part to enlarge said aperture so that one of said bosses is easily received therein while simultaneously maintaining the portion of said central part adjacent said corners in the original plane of said central part so that said corners will guide said disks onto said bosses, assembling said disks with said hub therebetween and with said bosses received in said apertures, compressing said deformed portions of each of said disks back into the planes of said central part and against the adjacent said shoulder on said hub to force said central part into compressing relation with the sides of said bosses to resist relative radial and angular movement between said disks and said hub, and securing said disks together to resist relative axial movement between said disks and said hub.

4. The method of manufacturing a pulley wheel which comprises the steps of providing a hub including at each end thereof a boss of polygonal radial cross-section and smaller area than the remainder of said hub for defining an annular shoulder on each end of said hub, blanking from sheet metal a pair of disks each including a central part and a rim portion interconnected by a predetermined number of radial spokes and each having in said central portion thereof a polygonal aperture having a configuration and size generally complementary to one of said bosses, said polygonal aperture having the same number of side edges as said number of said spokes with said edges intersecting at the corners of said aperture and said spokes being radially aligned with said corners, deforming the portions of said central part adjacent said edges out of the plane of said central part to enlarge said aperture so that one of said bosses is easily received therein while maintaining the portion of said central part adjacent said corners in the original plane of said central part, assembling said disks with said hub therebetween and with said bosses received in said apertures thus automatically aligning said spokes of each said disk, compressing said deformed portions of each said disk back into the plane of the associated said central part and against the adjacent said shoulder to force said central part into radial compressing relation with the sides of said bosses to resist relative radial movement between said disks and said hub, and securing said rim portions of said disks together to resist relative axial movement between said disks and said hub.

References Cited by the Examiner
UNITED STATES PATENTS

| | | |
|---|---|---|
| 1,785,924 | 12/30 | Wilson. |
| 2,177,191 | 10/39 | Sandberg _____ 29—520 |
| 2,641,935 | 6/53 | Wilken _____ 29—159 X |
| 2,656,730 | 10/53 | Mitchell _____ 29—159 X |
| 2,838,703 | 6/58 | Balke. |
| 3,009,176 | 11/61 | Knocke _____ 29—520 X |

WHITMORE A. WILTZ, *Primary Examiner.*

NEDWIN BERGER, *Examiner.*